(12) United States Patent
McKelvey et al.

(10) Patent No.: US 8,200,082 B2
(45) Date of Patent: Jun. 12, 2012

(54) FIBER CONNECTIVITY FOR EMERGENCY RESPONSE PERSONNEL

(75) Inventors: Henry A. McKelvey, Capitol Heights, MD (US); Terry O. Sims, Lanham, MD (US)

(73) Assignees: Verizon Patent and Licensing Inc., Basking Ridge, NJ (US); Verizon Virginia LLC, Richmond, VA (US)

( * ) Notice: Subject to any disclaimer, the term of this patent is extended or adjusted under 35 U.S.C. 154(b) by 1047 days.

(21) Appl. No.: 11/693,462

(22) Filed: Mar. 29, 2007

(65) Prior Publication Data

US 2008/0240730 A1 Oct. 2, 2008

(51) Int. Cl.
*H04B 10/20* (2006.01)
(52) U.S. Cl. .............................................. 398/5; 398/31
(58) Field of Classification Search .................. 398/5
See application file for complete search history.

(56) References Cited

U.S. PATENT DOCUMENTS

| | | | | |
|---|---|---|---|---|
| 5,568,525 A * | 10/1996 | de Nijs et al. | ................. | 375/356 |
| 6,421,593 B1 * | 7/2002 | Kempen et al. | ................. | 701/48 |
| 6,450,677 B1 * | 9/2002 | Knauer et al. | ................. | 362/551 |
| 6,466,258 B1 * | 10/2002 | Mogenis et al. | ............. | 348/143 |
| 6,680,998 B1 * | 1/2004 | Bell et al. | ......................... | 379/37 |
| 6,933,441 B2 * | 8/2005 | Fuller et al. | ..................... | 174/50 |
| 6,993,421 B2 * | 1/2006 | Pillar et al. | ....................... | 701/33 |
| 7,184,866 B2 * | 2/2007 | Squires et al. | ................. | 701/33 |
| 7,200,317 B2 * | 4/2007 | Reagan et al. | ................. | 385/139 |
| 7,254,468 B2 * | 8/2007 | Pillar et al. | ....................... | 701/22 |
| 7,275,967 B1 * | 10/2007 | Olliff | ............................. | 439/654 |
| 7,319,386 B2 * | 1/2008 | Collins et al. | ............ | 340/539.12 |
| 7,395,047 B2 * | 7/2008 | Mohler | ....................... | 455/404.2 |
| 7,400,816 B2 * | 7/2008 | Reagan et al. | ................ | 385/139 |
| 7,406,710 B1 * | 7/2008 | Zellner et al. | ................... | 726/14 |
| 7,486,860 B2 * | 2/2009 | Bell et al. | ......................... | 385/48 |
| 7,489,849 B2 * | 2/2009 | Reagan et al. | ................ | 385/135 |
| 2004/0146047 A1 * | 7/2004 | Turcan et al. | ................. | 370/352 |
| 2005/0025486 A1 * | 2/2005 | Zhong et al. | .................... | 398/79 |
| 2006/0133582 A1 * | 6/2006 | McCulloch | ..................... | 379/45 |
| 2006/0153517 A1 * | 7/2006 | Reagan et al. | ................ | 385/135 |
| 2006/0239691 A1 * | 10/2006 | Pender | ............................ | 398/139 |
| 2007/0217788 A1 * | 9/2007 | Gao et al. | .......................... | 398/5 |
| 2007/0237520 A1 * | 10/2007 | DeLew et al. | ................... | 398/17 |
| 2007/0263782 A1 * | 11/2007 | Stock et al. | ................... | 379/56.1 |
| 2007/0274722 A1 * | 11/2007 | Zhao et al. | ....................... | 398/71 |
| 2007/0300278 A1 * | 12/2007 | Carey et al. | ................... | 725/119 |
| 2008/0055423 A1 * | 3/2008 | Ying et al. | ............... | 348/211.99 |
| 2008/0056719 A1 * | 3/2008 | Bernard et al. | ................ | 398/71 |
| 2008/0065285 A1 * | 3/2008 | Yakes et al. | ..................... | 701/22 |
| 2008/0089692 A1 * | 4/2008 | Sorin | ............................ | 398/135 |
| 2008/0094207 A1 * | 4/2008 | Collins et al. | ............ | 340/539.12 |
| 2008/0175548 A1 * | 7/2008 | Knecht et al. | ................. | 385/100 |
| 2008/0221754 A1 * | 9/2008 | Rowe et al. | ....................... | 701/36 |
| 2008/0226039 A1 * | 9/2008 | Goldman et al. | ............... | 379/45 |
| 2008/0240730 A1 * | 10/2008 | McKelvey et al. | ............ | 398/168 |
| 2009/0046624 A1 * | 2/2009 | Martinez et al. | ................ | 370/319 |
| 2009/0148120 A1 * | 6/2009 | Reagan et al. | ................ | 385/135 |
| 2010/0004035 A1 * | 1/2010 | Ray et al. | ...................... | 455/572 |

* cited by examiner

*Primary Examiner* — Danny Leung

(57) ABSTRACT

A network may include fiber optic lines and fiber distribution panels connected by the one or more fiber optic lines. At least one of the fiber distribution panels may include an optical fiber connector designated as a connector that is for emergency use. The network may further include a plurality of optical network terminals located at premises of subscribers to the network.

19 Claims, 6 Drawing Sheets

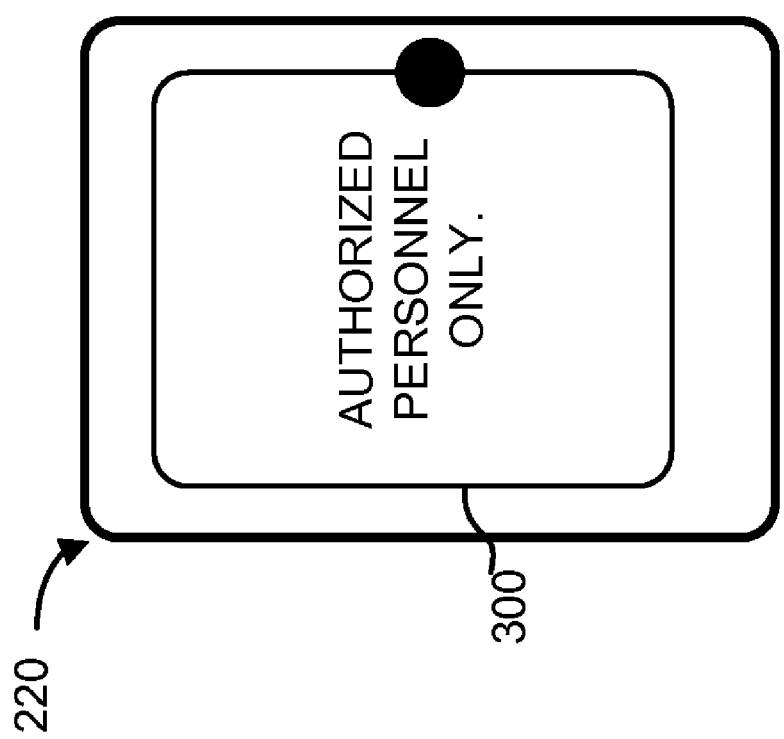

FIBER CONNECTIVITY FOR EMERGENCY RESPONSE PERSONNEL

BACKGROUND INFORMATION

Emergency response personnel, such as police and fire officers, may be in a situation in which they need emergency connectivity to a telecommunications network. For example, there may be a fire or a hostage situation in which the emergency response personnel need to connect to a local phone or data network.

Existing copper communication networks, such as networks supporting conventional telephone lines, may include copper connectors placed at various locations in a neighborhood, such as at various service or control points within the neighborhood. In an emergency situation, the emergency response personnel may connect to the network at these points. For example, an emergency response vehicle may include a wire that may be mated with copper connectors in one of the service or control points. The wire may connect to a telephone, thus potentially allowing the emergency response personnel to obtain emergency access to the telecommunication network.

BRIEF DESCRIPTION OF THE DRAWINGS

FIG. 3A is a diagram illustrating an exemplary front view of a fiber distribution panel;

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein allow emergency response personnel or other authorized personnel to connect to an optical network through fiber connectors installed at fiber distribution panels in the network.

Figure 1:
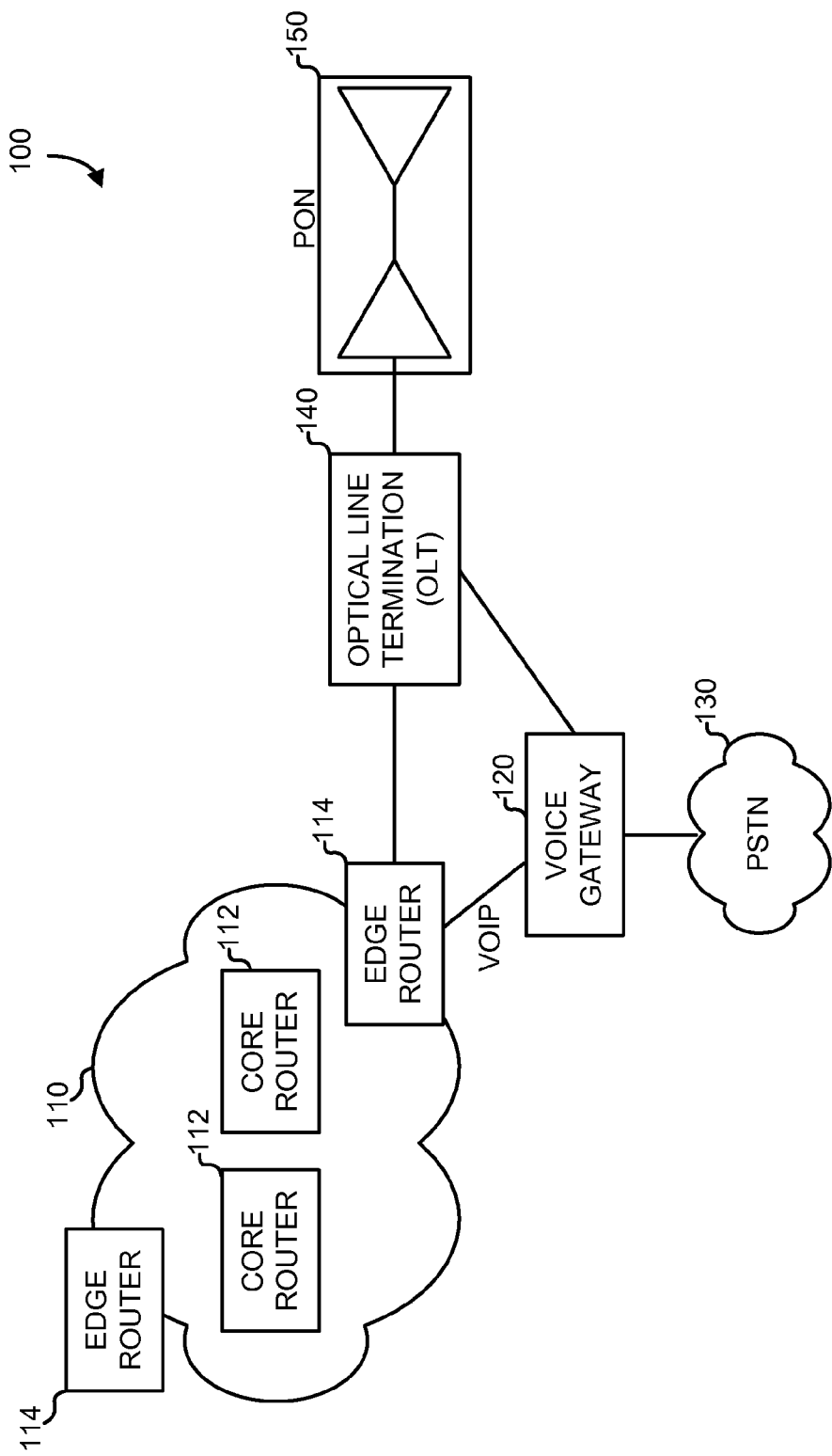
FIG. 1 is a diagram of an exemplary system in which embodiments described herein may be implemented.

FIG. 1 is a diagram of an exemplary system in which embodiments described herein may be implemented. As illustrated, system 100 may include a first network 110, a voice gateway 120, public switched telephone network (PSTN) 130, an optical line termination (OLT) unit 140, and a passive optical network (PON) 150.

First network 110 may include a Local Area Network (LAN), a wide area network (WAN), such as a cellular network, a satellite network, or the Internet, a private WAN, or a combination of the Internet and a private WAN, that is used to transport data. First network 110 may include a number of network devices. As is particularly shown in FIG. 1, first network 110 may include a number of routers or other switching devices that transmit data units, such as data packets, through first network 110. First network 110 may include core routers 112 and edge routers 114.

Edge routers 114 may generally function to connect devices, such as end-users, voice gateway 130, and optical line termination unit 140, to first network 110. Core routers 112 may generally function to transmit data between other routers within first network 110. In addition to simply routing data, edge routers 112 and core routers 114 may support other "value added" functions, such as quality of service (QoS) features, specialized security functions, such as IPsec (IP security) encryption, access control, statistics relating to multicast transmissions, or accounting features.

Voice gateway 120 may include any device capable of connecting first network 110 or OLT unit 140 to PSTN 130. Additionally, voice gateway 120 may include hardware and/or software for converting data from a PSTN format to a format compatible with first network 110 or OLT unit 140. Similarly, voice gateway 120 may include hardware and/or software for converting data from a format compatible with first network 110 or OLT unit 140 to a format useable by PSTN 130. For example, voice gateway 120 may convert voice calls between a packet data format compatible with first network 110 and a circuit-switched format compatible with PSTN 130.

PSTN 130 may include any network capable of carrying plain old telephone system (POTS) compatible data. For example, PSTN may include a circuit-switched network that may be implemented via fixed-line analog connections or digital connections. PSTN 130 may include central offices and/or switches for carrying data over twisted pair copper conductors and/or optical fibers.

A network service provider, such as for example, a telecommunications company providing network connectivity to subscribers, may provide such connectivity through optical connections. As shown in FIG. 1, for example, the optical connections may be provided by OLT unit 140 and PON 150. OLT unit 140 may include hardware and/or software that provides an interface between PON 150 and the backbone network (e.g., first network 110, voice gateway 120, and PSTN 130). OLT unit 140 may, for instance, be responsible for allocating bandwidth to subscribers and may provide time division multiplexed (TDM) interfaces such as SONET/SDH or PDH with PON 150. In general, OLT unit 140 may receive data from edge router 114 or voice gateway 120 and may provide the data to subscribers of PON 150 via TDM techniques.

PON 150 may include one or more strands of optical fiber and splitters for the optical fiber. The optical fibers that make up PON 150 may be physically distributed to a number of subscribers. For example, PON 150 may implement a fiber to the premises (FTTP) network in which a number of subscribers are provided with network connectivity by a length of optical fiber that runs from OLT unit 140 to the premises of the subscribers. The FTTP network may be used to provide, for example, one or both of telephone and broadband services (i.e., Internet connection, television, etc.) to the subscribers.

Figure 2:
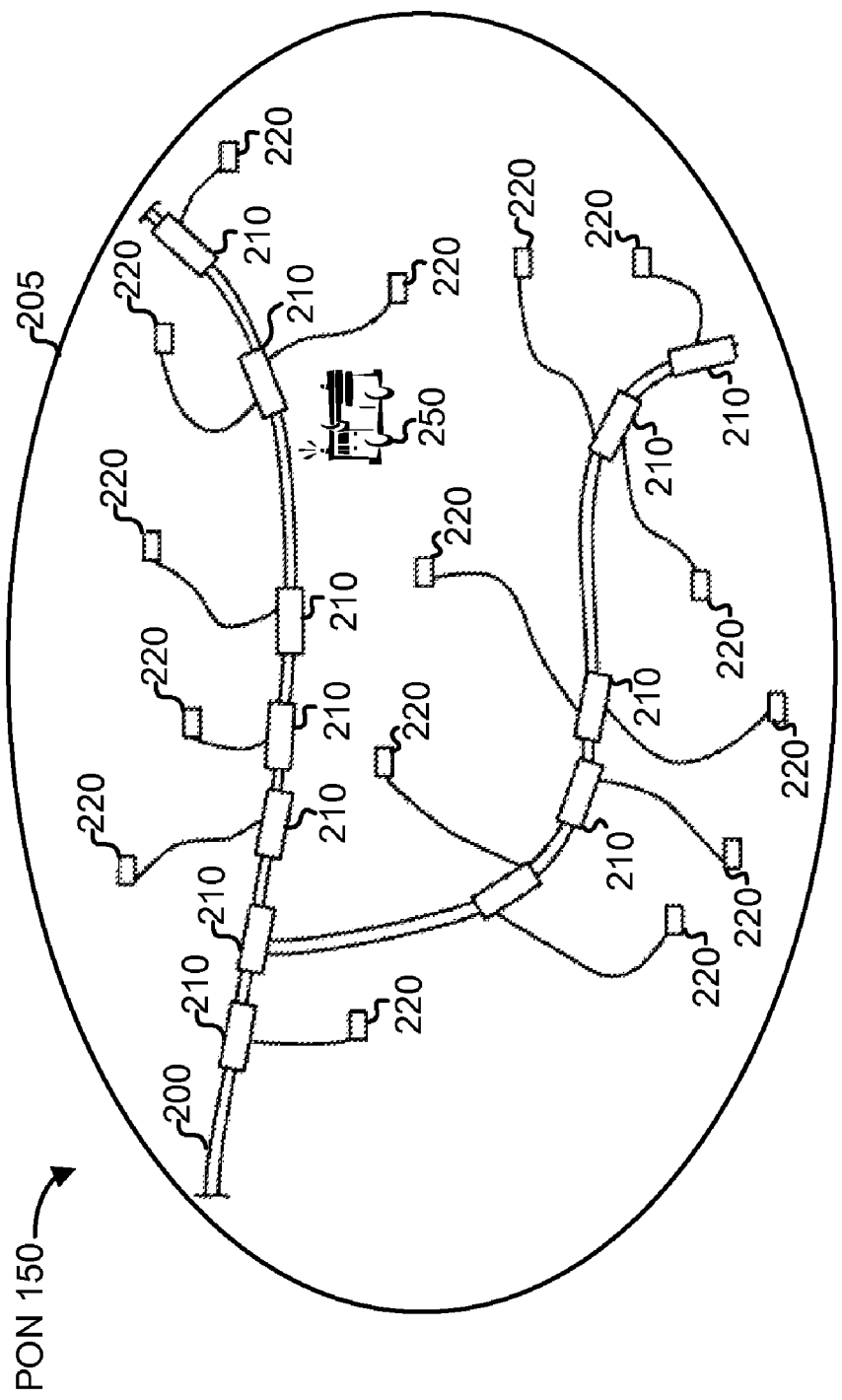
FIG. 2 is a diagram illustrating an exemplary implementation of the passive optical network shown in FIG. 1.

FIG. 2 is a diagram illustrating an exemplary implementation of PON 150 in a neighborhood. PON 150 is illustrated by fiber optic line(s) 200 that traverse a neighborhood 205. At various locations throughout neighborhood 205, fiber optic line(s) 200 may connect with fiber distribution panels 210 installed by the entity (e.g., the service provider or telecommunications company) that implemented PON 150. Fiber distribution panels 210 may include service terminals that are accessible by the service provider and emergency personnel, such as adjacent to a street, street intersections, or other locations that are readily accessible. Fiber distribution panels 210 may include locks or other security devices to deter access by unauthorized individuals. Fiber lines that enter fiber distribution panels 210 may be split using fiber splitters. The split lines may then proceed out of fiber distribution panels 210 to multiple different destinations.

At some point, a fiber line may terminate at the premises of an individual subscriber. Optical network terminals (ONTs) 220 may provide the termination points for a fiber line that terminates at the premise of a subscriber. Each ONT 220 may provide an interface between the fiber optic line and one or more wired or wireless networks within the subscriber's premises. ONTs 220 may thus operate to terminate PON 150 and present native service interfaces to the subscribers. These services can include voice (e.g., plain old telephone service (POTS), voice over IP (VoIP), etc.), data (e.g., Ethernet, V.35, etc.), video, and/or telemetry.

Each ONT 220 may be associated with a serial number that identifies the ONT. The serial number may be initially registered with the service provider at OLT unit 140. The service provider may then use the serial number to identify the ONT in subsequent communications with the ONT.

Consistent with embodiments described herein, fiber distribution panels 210 may include extra fiber connectors that are normally not connected. These extra connectors may be designated as emergency connectors. These extra connectors may be used by personnel that are using emergency vehicles or other emergency command and control centers. An exemplary emergency vehicle is illustrated in FIG. 2 as emergency vehicle 250.

FIG. 3A is a diagram illustrating an exemplary front view of one of fiber distribution panels 210. Fiber distribution panel 210 may include, for example, a door 300 that allows access to the optical fiber lines that are part of PON 150. Door 300 may generally be locked or otherwise include a controlled access mechanism. As shown, door 300 may include labeling that indicates that door 300 is only to be opened by authorized personnel.

Figure 3B:
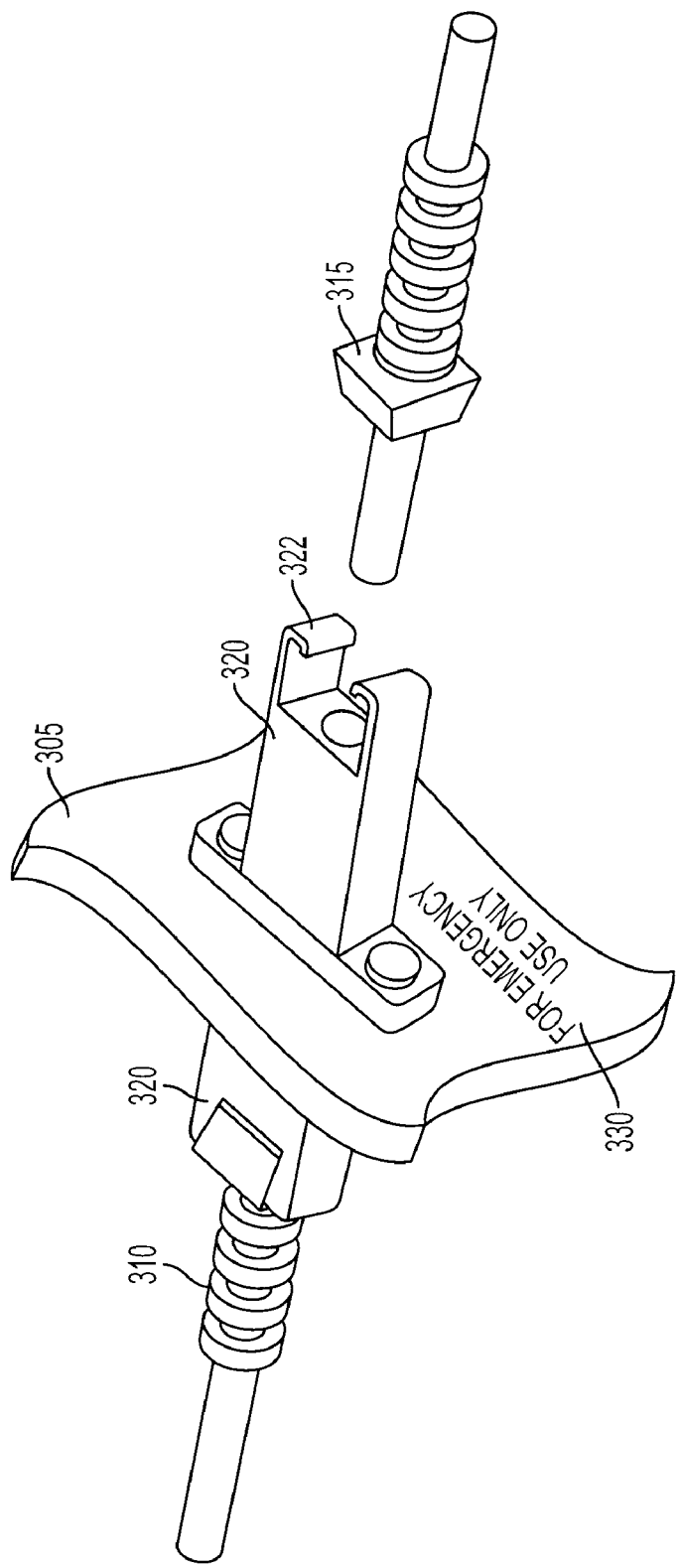
FIG. 3B is a diagram illustrating an exemplary optical connector interface in a fiber distribution panel.

FIG. 3B is a diagram illustrating an exemplary interface 305 of an emergency connector in a fiber distribution panel 210. Interface 305 may be accessible when door 300 is opened. Interface 305 of fiber distribution panel 210 may include an optical fiber connector 320 that is mounted within interface 305. Optical fiber connector 320 may provide a pluggable receptacle 322 that can mate with the end of connectorized optical fiber 315 without requiring splicing. A "connectorized" optical fiber, as used herein, refers to one that includes a pluggable connector, as opposed to an optical fiber that is connected via splicing. The mated optical fiber 315 may then be optically connected with optical fiber 310 within fiber distribution panel 210. In operation, optical fiber connector 320 may align the core of optical fibers 310 and 315 so that light can pass and may provide a mechanical coupling to hold an inserted fiber line.

A number of different types of optical fiber connectors 320 may be used. In one implementation, optical fiber connector 320 may include an angled physical contact (APC) to reduce optical back reflections.

In some implementations, optical fiber connector 320 may be specifically labeled to indicate that it is for emergency use only. This is illustrated in FIG. 3B as label 330.

Figure 4:
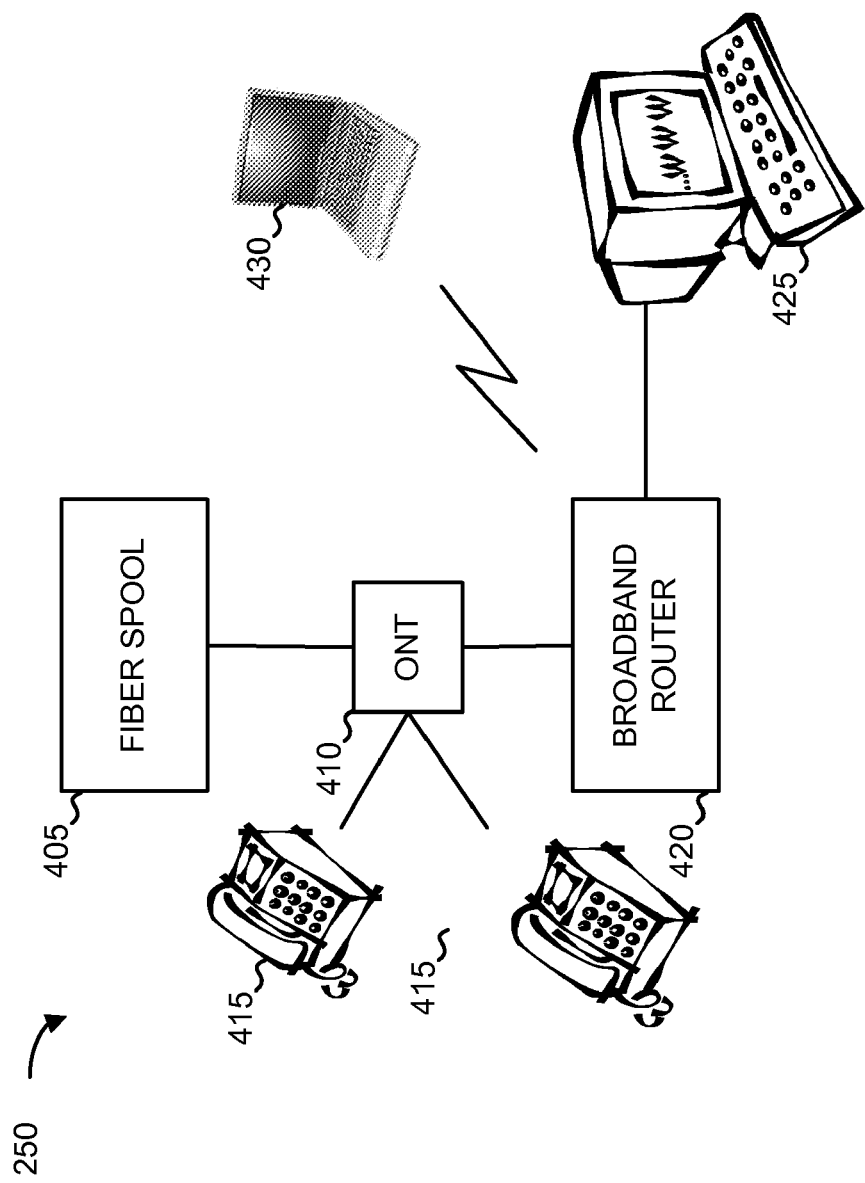
FIG. 4 is a functional block diagram of an exemplary portion of an emergency response vehicle.

FIG. 4 is a functional block diagram of an exemplary portion of an emergency response vehicle, such as emergency response vehicle 250. Emergency response vehicle 250 may act as a command and control center during emergencies, such as fire and hostage situations. During such a situation, it may be desirable for emergency response personnel to have access to PON 150.

Emergency response vehicle 250 may include a spool of fiber 405 and an optical network terminal (ONT) 410. Fiber spool 405 may include a length of fiber optic line. For example, fiber spool 405 may include at least approximately 100 feet of environmentally hardened fiber optic cable. One end of the fiber line on fiber spool 405 may include a connector designed to mate with optical fiber connector 320. The connector may be an APC-type connector. The other end of the cable on fiber spool 405 may include a connector designed to mate with ONT 410. In one implementation, the connectors on the two ends of the fiber line on fiber spool 405 may be identical.

ONT 410 may provide an interface between the fiber optic line on fiber spool 405 and one or more other computing/communication devices in emergency response vehicle 250. ONT 410 may be, for example, a relatively small electronic device that is stored in emergency response vehicle 250. ONT 410 may be powered from a power outlet in emergency response vehicle 250 and/or may include a battery to provide power to ONT 410.

ONT 410 may include one or more output ports for connecting to computing or telephony devices. For example, ONT 410 may include a number of Ethernet ports for connecting digital devices. In the exemplary implementation shown in FIG. 4, for instance, two voice over IP (VoIP) telephones 415 and a broadband router 420 are shown connected to ONT 410. Further, a personal computer 425 and a portable personal computer 430 are shown as being indirectly connected to ONT 410 via broadband router 420.

VoIP telephones 415 may connect to ONT 410 and allow telephone calls to be made by emergency personnel. Depending on the destination device associated with a telephone call, VoIP calls may be routed to, for example, either first network 110 or PSTN 130. Additionally, in some implementations, instead of connecting VoIP telephones 415 to ONT 410, conventional telephones may be connected to ONT 410 through an adapter configured to convert analog signals from a conventional analog telephone to a VoIP format.

Broadband router 420 may include a device that buffers and forwards data packets to devices connected to broadband router 420. Broadband router 420 may connect to ONT 410 via a wired Ethernet connection and may forward data from first network 110 to other computing devices connected to broadband router 420. Broadband router 420 may provide both wired and wireless connections to the other computing devices. As previously mentioned, two exemplary computing devices are shown in FIG. 4 as connected to broadband router 420, a personal computer 425 and a portable personal computer 430. In this example, personal computer 425 is connected via a wired connection to broadband router 420 (e.g., wired Ethernet) and portable personal computer 430 is connected via a wireless connection to broadband router 420 (e.g., a WiFi connection).

Although fiber spool 405 and ONT 410 were described above as being included in emergency response vehicle 250, it can be appreciated that fiber spool 405 and ONT 410 do not necessarily need to be fixed or stored in any particular vehicle. Similarly, VoIP telephones 415, broadband router 420, personal computer 425, and portable personal computer 430 do not necessarily need to be stored in a particular vehicle. For example, emergency personnel may carry these devices with them as necessary.

Figure 5:
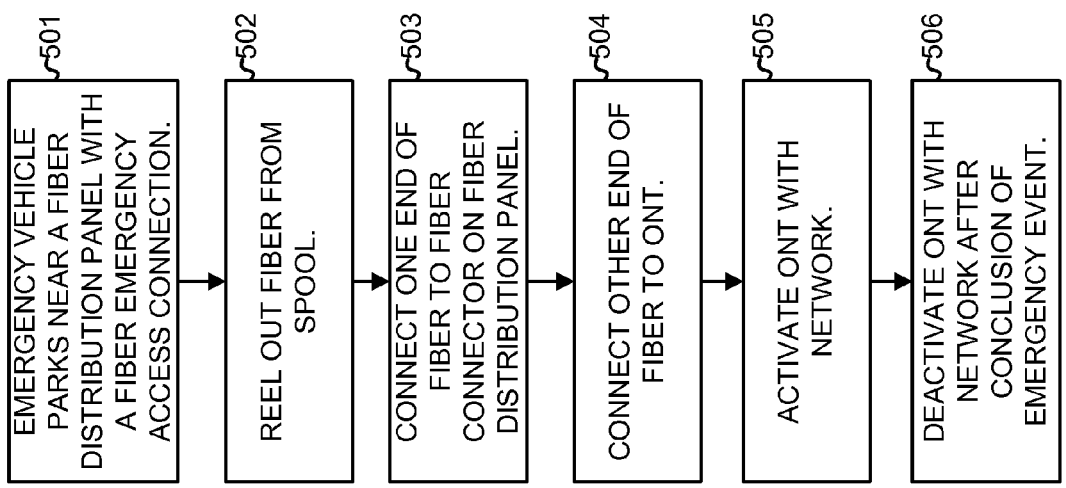
FIG. 5 is a flow chart illustrating exemplary operations associated with concepts described herein.

FIG. 5 is a flow chart illustrating exemplary operations associated with concepts described herein. An emergency vehicle may park or otherwise stop near a fiber distribution panel 210 that includes an optical fiber connector 320 intended for emergency access (act 501). The fiber distribution panel may include, for example, markings to indicate that it includes a connector for use by emergency personnel. In some implementations, the connector may be within a locked or closed panel on fiber distribution panel 210.

An emergency response person or a technician (or other representative) from the telecommunications company may run the fiber line from fiber spool 405 to optical fiber connector 320 (act 502). As mentioned previously, the ends of the fiber line on fiber spool 405 may include connectors designed to mate with fiber connector 320. The emergency response person or technician may then connect the connector on the end of the fiber line with optical fiber connector 320 (act 503).

The other end of the fiber line from fiber spool 405 may be connected to ONT 410 (act 504). In some implementations, the other end of the fiber line from fiber spool 405 may be permanently or semi-permanently connected to ONT 410 and thus would not need to be connected.

ONT 410 may be activated for the network (act 505). For example, the technician or the emergency response person may contact the telecommunications company that controls PON 150, such as by contacting a fiber service center at the telecommunications company, and provide the telecommunications company with the serial number of ONT 410. The telecommunications company may then provision OLT unit 140 to communicate with that ONT 410. In this manner, OLT unit 140 is registered with ONT 410. Once ONT 410 is active, the emergency vehicle may, for example, be given access to predetermined phone numbers to communicate with desired parties or may be able to use VoIP telephones 415 as normal phones. Additionally, the emergency vehicle may have broadband data access (e.g., at computing devices 425 and 430). Allowing emergency response personnel to connect to PON 150 may increase the ability of such personnel to effectively respond to emergency situations.

At some point, the emergency event that caused the emergency response personnel to need telephony or data provided through PON 150 may end. At this point, ONT 140 may be deactivated with PON 150 (act 506).

Although the techniques described herein were given in the context of being used by emergency response personnel, it can be appreciated that other authorized users may be similarly given access to the fiber network. Similarly, although an emergency response vehicle was described, it can be appreciated that a vehicle is not strictly necessary. For example, the emergency response personnel may carry a length of fiber and ONT 410 to a fiber distribution panel in PON 150.

CONCLUSION

Implementations described herein allow emergency response personnel to connect to a fiber network.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of acts has been described above with respect to FIG. 5, the order of the acts may differ in other implementations. Moreover, non-dependent acts may be performed in parallel.

It will be apparent that aspects of the invention, as described above, may be implemented in many different forms of software, firmware, and hardware in the implementations illustrated in the figures. The actual software code or specialized control hardware used to implement the invention is not limiting of the invention. Thus, the operation and behavior of the aspects of the invention were described without reference to the specific software code—it being understood that one would be able to design software and control hardware to implement the aspects based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   unwinding a fiber line from a fiber spool, a first and second end of the fiber line having a connectorized end;
   plugging the first connectorized end of the fiber line into an optical fiber connector in an optical fiber panel, the optical fiber panel providing an access point to a passive optical network, and the optical fiber connector being a connector designated for emergency use;
   plugging the second connectorized end of the fiber line into an optical network terminal device of at least one emergency response personnel;
   activating, in response to an emergency event, the optical network terminal device for the passive optical fiber network,
   where activating the optical network terminal device comprises:
      providing a serial number of the optical network terminal device to a fiber service center, and
      receiving, in response to providing the serial number, access to predetermined telephone numbers; and
   receiving, via the optical network terminal device, emergency telephony services, using at least one of the predetermined telephone numbers, and emergency data services, the received emergency data and telephony services being provided to the at least one emergency response personnel,
   where receiving the emergency telephony services comprises communicating with one or more parties, during the emergency event, using at least one of the predetermined telephone numbers and the activated optical network terminal device.

2. The method of claim 1, where the fiber line includes at least approximately 100 feet of environmentally hardened fiber optic cable.

3. The method of claim 1, where the optical fiber connector includes an angled physical contact (APC) type connector.

4. The method of claim 1, where activating the optical network terminal device further comprises registering the optical network terminal with an optical line terminal unit, based on the serial number.

5. An optical network comprising:
   a plurality of fiber distribution panels, at least one of the plurality of fiber distribution panels including an external optical fiber connector designated as an emergency connector that is not normally connected to an external optical fiber line,
   the external optical fiber connector to:

receive an optical fiber provided by an emergency response personnel, and provide emergency data or telephony services, via the optical network, to an optical network terminal of the emergency response personnel, where the optical network terminal is provided by a vehicle of the emergency response personnel, and where the vehicle of the emergency response personnel operates as a command and control center during emergency events, using the optical network terminal and the provided emergency data or telephony services;

a plurality of optical network terminals located at premises of subscribers to the optical network; and one or more optical fiber lines connecting the plurality of fiber distribution panels and the plurality of optical network terminals, where, during an emergency event, the optical network terminal allows the emergency personnel to communicate with one or more of the subscribers, via the one or more optical fiber lines.

6. The network of claim 5, where the network provides data and telephony service to the subscribers.

7. The network of claim 5, where the at least one of the plurality of fiber distribution panels is positioned in a location that is readily accessible.

8. The network of claim 5, further comprising:

an optical line termination unit to provide an interface between the optical network, provided by the plurality of fiber distribution panels and the one or more optic fiber lines, and a second network.

9. The network of claim 5, where the optical fiber connector provides mechanical coupling to hold an optical fiber inserted therein.

10. The network of claim 5, where the optical fiber connector includes an angled physical contact (APC)-type connector.

11. The network of claim 5, where the at least one of the plurality of fiber distribution panels further includes:

a hinged door to provide controlled access to the optical fiber connector.

12. A method comprising:

receiving, in response to an emergency event, a fiber line at a fiber distribution panel in a passive optical network, the fiber line being received in an optical fiber connector, in the fiber distribution panel, that provides a mechanical coupling between the received fiber line and the fiber distribution panel;

activating an optical network terminal, connected to the received fiber line and provided by an emergency response personnel, based on a serial number of the optical network terminal, to provide emergency data or telephony services, via the optical network terminal, to the emergency response personnel during the emergency event, where the emergency response personnel responds to the emergency event using the provided emergency data or telephony services;

receiving, in response to activating the optical network, access to predetermined telephone numbers;

communicating, using at least one of the predetermined telephone numbers and the activated optical network terminal, with one or more parties during the emergency event; and deactivating the optical network terminal at a conclusion of the emergency event.

13. The method of claim 12, where activating the optical network terminal includes:

registering the optical network terminal at an optical line termination unit to provide an interface between the passive optical network and a second network.

14. The method of claim 12, where the optical fiber connector includes an angled physical contact (APC)-type connector.

15. The method of claim 12, where the fiber line includes environmentally hardened fiber optic cable.

16. The method of claim 15, where the fiber line includes a connectorized end to mate with the optical fiber connector.

17. The method of claim 12, where the receiving the fiber line comprises:

receiving the fiber from an emergency response vehicle associated with the emergency response personnel, where the emergency response vehicle includes the optical network terminal, and where the emergency response vehicle operates as a command and control center during the emergency event.

18. The method of claim 1, where the at least one emergency response personnel includes at least one of a police officer or a fire officer, and where the fiber line and the optical network terminal device are provided by an emergency response vehicle of the emergency response personnel.

19. The optical network of claim 5, where the at least one of the plurality of fiber distribution panels further includes information identifying access to the at least one of the plurality of fiber distribution panels as restricted to emergency personnel.

\* \* \* \* \*